(12) United States Patent
Heatherly et al.

(10) Patent No.: US 10,293,247 B2
(45) Date of Patent: May 21, 2019

(54) PHYSICAL PIECES FOR INTERACTIVE APPLICATION USING TOUCH SCREEN DEVICES

(75) Inventors: Christopher W. Heatherly, Monrovia, CA (US); Kenlip Ong, Burbank, CA (US); Armen Mkrtchyan, Glendale, CA (US); Jonathan Backer, Burbank, CA (US); Brian White, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 193 days.

(21) Appl. No.: 13/135,538

(22) Filed: Jul. 7, 2011

(65) Prior Publication Data

US 2012/0007817 A1    Jan. 12, 2012

(51) Int. Cl.
*A63F 13/2145* (2014.01)
*A63F 13/40* (2014.01)
(Continued)

(52) U.S. Cl.
CPC ...... *A63F 13/2145* (2014.09); *A63F 3/00643* (2013.01); *A63F 13/40* (2014.09);
(Continued)

(58) Field of Classification Search
CPC .. A63F 13/2145; A63F 13/40; A63F 3/00643; A63F 2009/241;
(Continued)

(56) References Cited

U.S. PATENT DOCUMENTS 5,853,327 A * 12/1998 Gilboa ............... A63F 3/00643
                                                          273/237
5,896,403 A     4/1999 Nagasaki
(Continued)

FOREIGN PATENT DOCUMENTS

CN          101052446     10/2007
CN          100549926     10/2009
WO       WO 2006/082547    8/2006

OTHER PUBLICATIONS

Chinese Office Action dated Jan. 13, 2015 for Chinese Patent Application No. 201210300862.7.

*Primary Examiner* — Claire X Pappas
*Assistant Examiner* — Ngan T Pham Lu
(74) *Attorney, Agent, or Firm* — Farjami & Farjami LLP

(57) ABSTRACT

There are provided systems and methods for facilitating an interaction with a first peripheral device using a touch-sensitive system having a processor and a touch surface. An example method includes detecting, using the processor, the first peripheral device touching the touch surface of the touch-sensitive system, identifying, using the processor, the first peripheral device touching the touch surface of the touch-sensitive system, and determining, using the processor, that the first peripheral device has an accessory attached thereto. A method may include determining, using the processor, transformation of the first peripheral device. Another method may include determining, using the processor, a position of the first peripheral device with respect to digital elements displayed on the touch surface, and interacting with the first peripheral device based on the position of the first peripheral device with respect to the digital elements displayed on the touch surface.

14 Claims, 5 Drawing Sheets

(51) Int. Cl.
*G06F 3/041* (2006.01)
*A63F 3/00* (2006.01)
*G06F 3/0488* (2013.01)
*G06F 3/044* (2006.01)
*A63F 9/24* (2006.01)

(52) U.S. Cl.
CPC ............ *G06F 3/044* (2013.01); *G06F 3/0416* (2013.01); *G06F 3/0488* (2013.01); *A63F 2009/241* (2013.01); *A63F 2300/1075* (2013.01); *G06F 2203/04808* (2013.01)

(58) Field of Classification Search
CPC ........... A63F 2300/1075; G06F 3/0416; G06F 3/044; G06F 3/0488; G06F 2203/04808
See application file for complete search history.

(56) References Cited

U.S. PATENT DOCUMENTS

| | | |
|---|---|---|
| 6,439,956 B1 | 8/2002 | Ho |
| 7,397,464 B1 | 7/2008 | Robbins |
| 8,358,286 B2 * | 1/2013 | Cannon ................... A63F 13/02 345/174 |
| 2005/0245302 A1 | 11/2005 | Bathiche |
| 2006/0154559 A1 | 7/2006 | Yoshida |
| 2006/0230192 A1 | 10/2006 | Parry |
| 2007/0062852 A1 | 3/2007 | Zachut et al. |
| 2008/0004110 A1 | 1/2008 | Cortenraad |
| 2008/0153594 A1 * | 6/2008 | Zheng ..................... A63H 3/36 463/39 |
| 2008/0161086 A1 * | 7/2008 | Decre et al. .................... 463/14 |
| 2008/0191864 A1 * | 8/2008 | Wolfson ................. G06F 3/011 340/524 |
| 2008/0300055 A1 | 12/2008 | Lutnick |
| 2009/0322352 A1 * | 12/2009 | Zachut et al. ................ 324/658 |
| 2010/0138344 A1 | 6/2010 | Wong |
| 2010/0261526 A1 | 10/2010 | Anderson |
| 2011/0210931 A1 * | 9/2011 | Shai ....................... G06F 3/014 345/173 |
| 2011/0227871 A1 * | 9/2011 | Cannon ................... A63F 13/02 345/174 |
| 2012/0019480 A1 | 1/2012 | Cannon |
| 2012/0264089 A1 * | 10/2012 | Hoang ..................... G09B 5/00 434/107 |

* cited by examiner

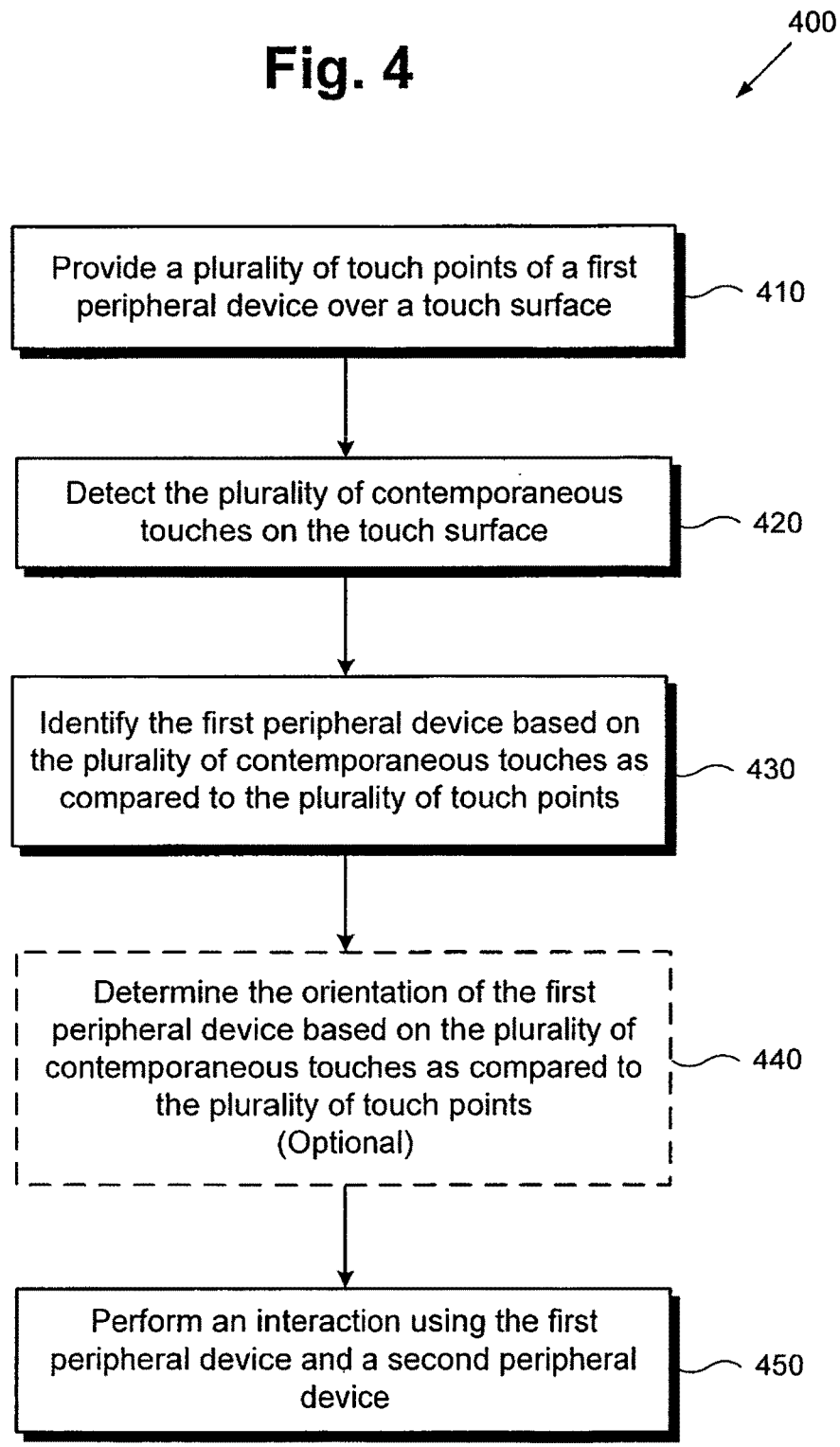

PHYSICAL PIECES FOR INTERACTIVE APPLICATION USING TOUCH SCREEN DEVICES

RELATED APPLICATIONS

This application is a continuation of U.S. application Ser. No. 12/806,986, filed Aug. 24, 2010, which claims priority to U.S. Provisional Application No. 61/399,249, filed on Jul. 8, 2010, which is hereby incorporated by reference in its entirety.

BACKGROUND OF THE INVENTION

1. Field of the Invention

The present invention relates generally to the field of gaming, and more particularly, to gaming using touch-sensitive surfaces.

2. Background Art

Touch-sensitive devices, such as touch screen devices, are becoming increasingly prevalent in the marketplace. These touch-sensitive devices offer a touch-sensitive surface that can detect the presence and position of touch-based input opening up the possibility of new ways to interact with electronic devices. The popularity of recent touch screen devices, such as iPad from APPLE®, means that touch screen devices can be found among many family households. At the same time, physical toys remain a staple of kids, with collectible figures and objects serving as a bedrock for imaginative toy play in the form of interaction between the figures and objects as well as the larger environment.

In this context, kids are having increased exposure to touch screen devices making it desirable to provide new technologies, which can enhance the interactive experience with touch screen devices and their existing toys.

The conventional approach is to integrate toys with video games or other software running on a computer through establishing wired or wireless communications between a toy and the computer. However, adding a communication interface for the toys, such as bluetooth, Wi-Fi, audio I/O interfaces, or proprietary wired connectors adds substantial costs and complexity to the toys.

Accordingly, there is a need to overcome the drawbacks and deficiencies in the art while providing interactive toys, which can be used with touch screen devices.

SUMMARY OF THE INVENTION

A system and method for providing physical pieces for interactive, applications using touch screen devices, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which a touch-sensitive system may facilitate an interaction using first and second peripheral devices.

DETAILED DESCRIPTION OF THE INVENTION

The present application is directed to a system and method of facilitating an interaction using first and second peripheral devices and related structures. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
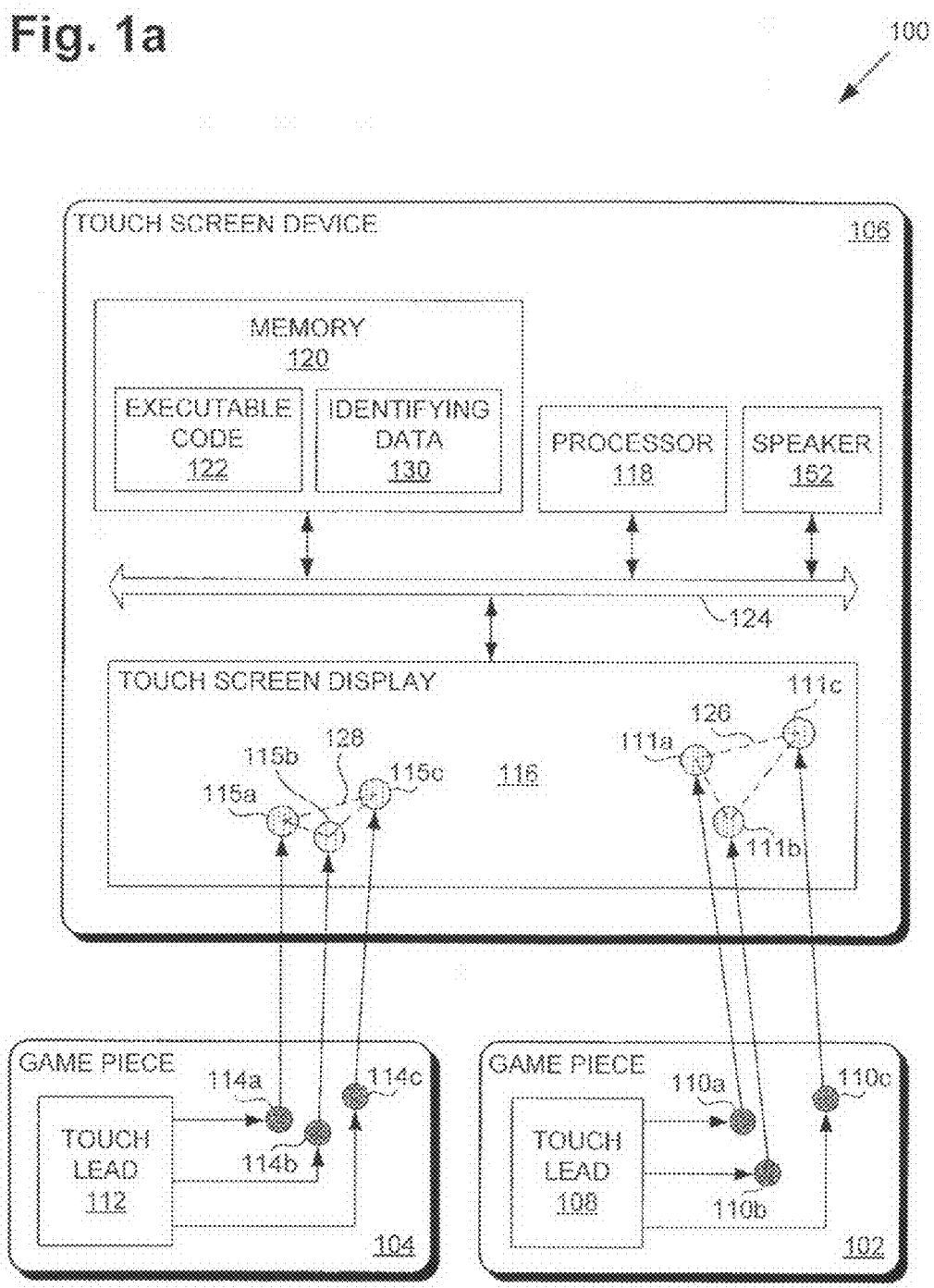
FIG. 1a presents a diagram of a touch-sensitive system for facilitating an interaction using a first peripheral device and a second peripheral device, according to one embodiment of the present invention.

FIG. 1a presents a diagram of a touch-sensitive system for facilitating an interaction using a first peripheral device and a second peripheral device, according to one embodiment of the present invention. Diagram 100 of FIG. 1a includes peripheral devices 102 and 104 and electronic device 106. Peripheral device 102 includes touch lead 108 and touch points 110a, 110b, and 110c. Peripheral device 104 includes touch lead 112 and touch points 114a, 114b, and 114c. Electronic device 106 includes touch surface 116, processor 118, speaker 152, and memory 120. Memory 120 includes executable code 122 and identifying data 130.

Figure 1B:
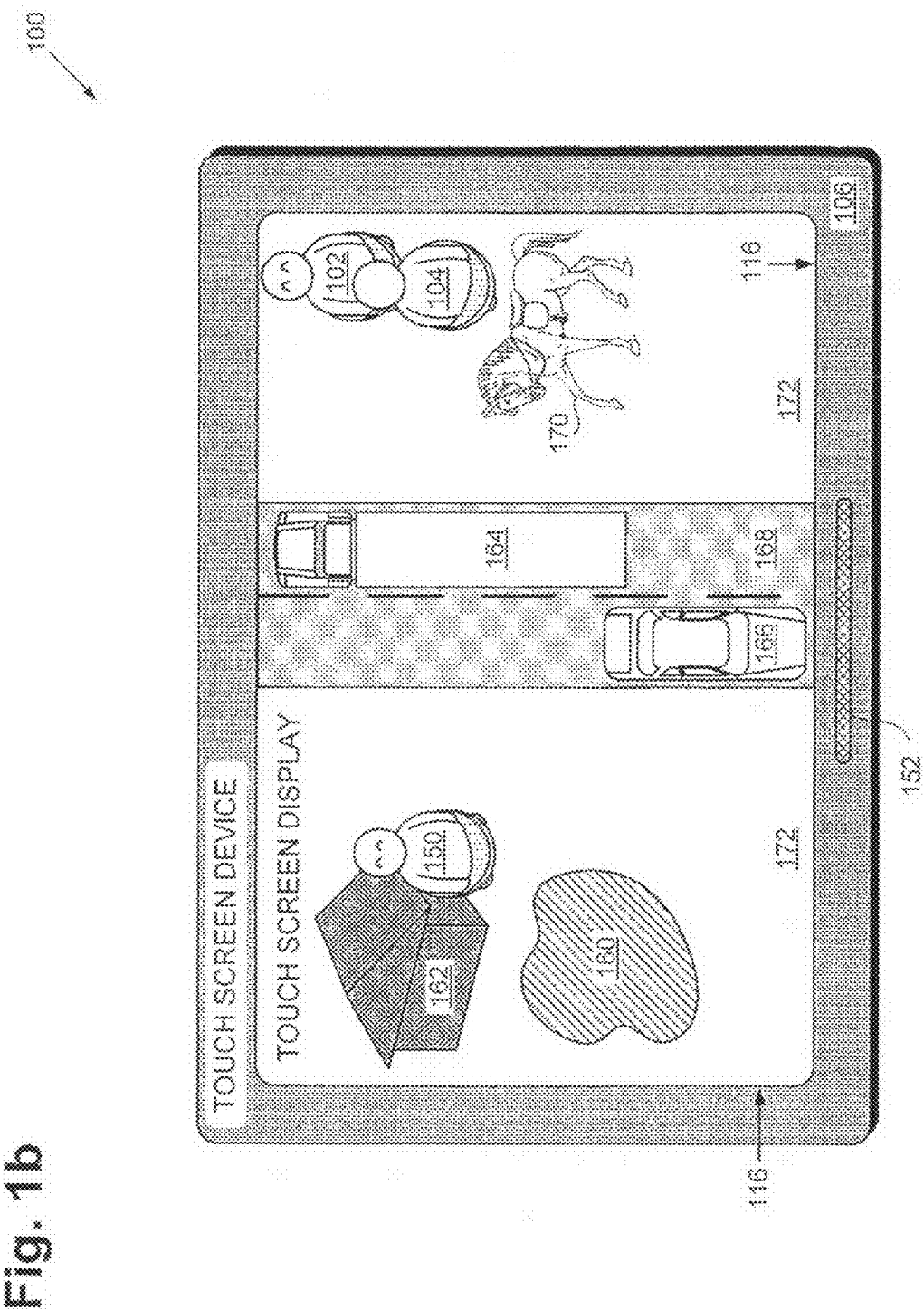
FIG. 1b shows a touch-sensitive system for facilitating an interaction using a first peripheral device and a second peripheral device, according to one embodiment of the present invention.

It should be noted that the embodiment shown in diagram 100 of FIG. 1a is one specific embodiment and is simplified for clarity. In alternative embodiments, for example, peripheral devices 102 and 104 and electronic device 106 can include varying components and configurations. Also, in some embodiments more than two peripheral devices 102 and 104 may be used simultaneity, e.g. three, four or more. In the embodiment shown in FIG. 1a, electronic device 106 comprises a touch screen device and touch surface 116 comprises a touch screen display. For example, FIG. 1b, shows peripheral devices 102, 104, and 150 (not shown in FIG. 1a) on touch surface 116, which comprises a touch screen display of electronic device 106. FIG. 1b shows touch surface 116 formed in the top surface of electronic device 106. However, in other embodiments, touch surface 116 can be connected externally to electronic device 106.

Peripheral devices 102 and 104 comprise, for example, interactive game pieces and/or toys where the touch-sensitive system of FIGS. 1a and 1b can facilitate an interaction using first peripheral device 102 and second peripheral device 104, and optionally other devices, such as peripheral device 150. The interaction can be facilitated by identifying a peripheral device provided over touch surface 116. The interaction can also be facilitated by determining the position and orientation of the peripheral devices relative to touch surface 116. In some embodiments, the interaction can be structured as a video game, for example, FIG. 1b shows peripheral devices 102, 104, and 150 representing digital characters in a video game running on electronic device 106. FIG. 1b includes digital elements displayed as an image on touch surface 116, such as, lake 160, house 162, truck 164, car 166, road 168, horse 170, and grass 172. In various embodiments, electronic device 106 can run the video game based on any of the identity, position, and orientation of peripheral devices 102, 104, and 150. As such, peripheral devices 102, 104, and 150 can interact with the digital elements displayed on touch surface 116.

In one example, the video game can be an electronic board game where touch surface 116 can display the game board and peripheral devices 102, 104, and 150 can comprise game pieces. For example, in one embodiment, peripheral devices 102, 104, and 150 can be chess pieces used with a chess board displayed on touch surface 116, where electronic device 106 can identify each chess piece and run a game of chess. Thus, electronic device 106 can, for example, identify peripheral device 102 as a black king and peripheral device 150 as a white king and provide a scoreboard or offer a suggested move displayed on touch surface 116 based on the identity and position of various chess pieces.

In the present embodiment, processor 118, speaker 152, memory 120, and touch surface 116 of electronic device 106 can communicate using bus 124. More particularly, processor 118, speaker 152, memory 120, and touch surface 116 can use bus 124 to facilitate an interaction using peripheral device 102 and another device, such as peripheral device 104. It will be appreciated that processor 118, speaker 152, memory 120, and touch surface 116 can be connected to one another using other means, for example, a plurality of dedicated lines, or a combination of buses and dedicated lines.

Processor 118, which can comprise, for example, a central processing unit (CPU), is configured to operate in accordance with executable code 122 stored in memory 120. Memory 120 can comprise random access memory (RAM) and executable code 122 can include a software program, for example, a video game, educational software, or other software, such that processor 118 operates in accordance with instructions in the software program. By operating in accordance with executable code 122, processor 118 can facilitate an interaction using peripheral devices 102 and 104.

In electronic device 106, processor 118 can detect a plurality of contemporaneous touches on touch surface 116. Thus, touch surface 116 is capable of registering the presence and position of multiple touch-based inputs thereon. In one particular embodiment, touch surface 116 is a capacitive touch screen, which uses charge variation to sense touch-based input. Processor 118 can detect, for example, contemporaneous touches 126 shown in FIG. 1a. Contemporaneous touches 126 include touches 111a, 111b, and 111c and can be provided on touch surface 116 by peripheral device 102. More particularly, touches 111a, 111b, and 111c can be provided by respective touch points 110a, 110b, and 110c, which can comprise conductive material. Processor 118 can also detect contemporaneous touches 128. Contemporaneous touches 128 include touches 115a, 115b, and 115c and can be provided on touch surface 116 by peripheral device 104. More particularly, touches 115a, 115b, and 115c can be provided by respective touch points 114a, 114b, and 114c, which can comprise conductive material.

Processor 118 can also identify peripheral device 102 based on contemporaneous touches 126 as compared to one of touch points of peripheral device 102 and touch points of peripheral device 104. In the present embodiment, for example, processor 118 can identify peripheral device 102 using identifying data 130, which can characterize touch points of peripheral device 102 and touch points of peripheral device 104. According to one embodiment, identifying data 130 in memory 120 can comprise distances between touch points of peripheral device 102 and distances between touch points of peripheral device 104, which will be further described with respect to FIGS. 2a and 2b.

Figure 2B:
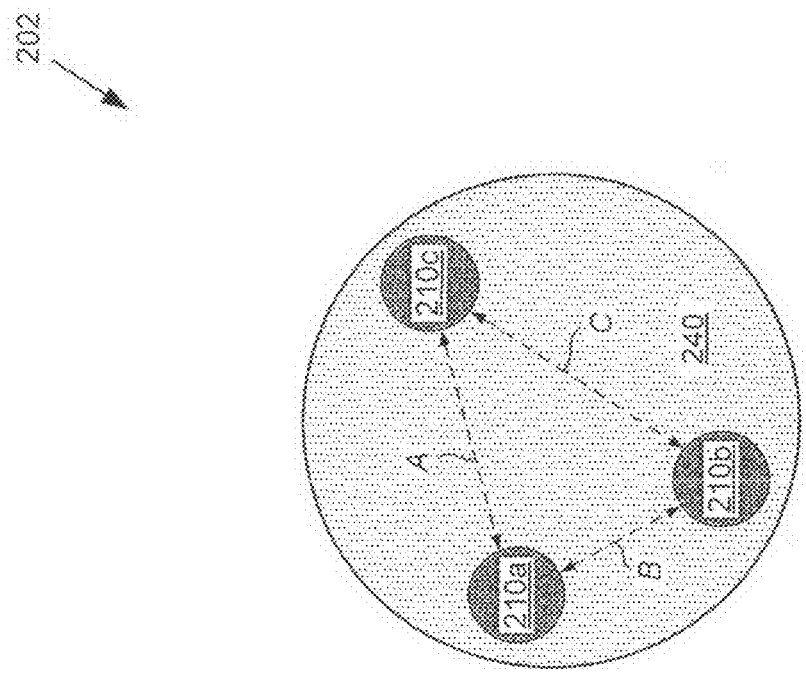
FIG. 2b shows a bottom view of a peripheral device according to one embodiment of the present invention.
Figure 2A:
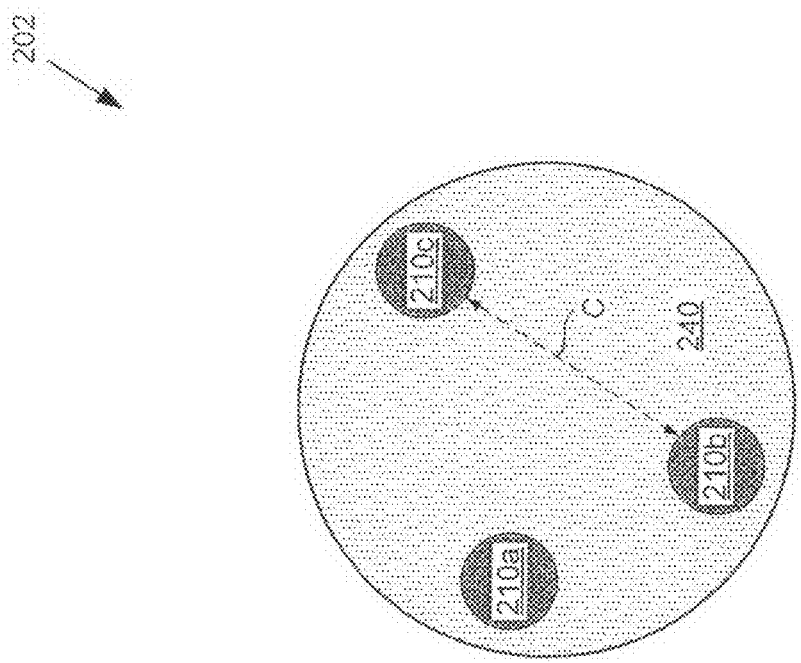
FIG. 2a shows a bottom view of a peripheral device according to one embodiment of the present invention.

Referring to FIG. 2a, FIG. 2a shows a bottom view of peripheral device 202 according to one embodiment of the present invention. Peripheral device 202, corresponding to peripheral device 102 in FIGS. 1a and 1b, includes base 240 and touch points 210a, 210b, and 210c, which correspond to touch points 110a, 110b, and 110c in FIG. 1a. In one embodiment, processor 118 can identify peripheral device 202 based on contemporaneous touches 126 as compared to one of two touch points of peripheral device 202 and two touch points of peripheral device 104, for example, touch points 210b and 210c of peripheral device 202 and touch points 114b and 114c of peripheral device 104. Thus, for example, in the embodiment described with respect to FIG. 2a, touch point 210a not required for identifying peripheral device 202.

Identifying data 130 can characterize the arrangement of touch points 210b and 210c of peripheral device 202 and touch points 114b and 114c of peripheral device 104. As shown in FIG. 2a, touch points 210b and 210c have a particular arrangement on base 240. For example, touch points 210b and 210c are separated by distance C. When touch points 210b and 210c provide touches 111b and 111c in contemporaneous touches 126 on touch surface 116, touches 111b and 111c will also be separated by distance C. Thus, according to one embodiment, distance C, between touch points 210b and 210c, can characterize the arrangement of touch points 210b and 210c. Thus, identifying data 130 in memory 120 can comprise distance C.

Similarly, identifying data 130 in memory 120 can comprise a distance between touch points 114b and 114c, which characterizes the arrangement of touch points 114b and 114c of peripheral device 104. The distance between touch points 114b and 114c can be different than distance C, such that processor 118 can distinguish between touch points 114b and 114c of peripheral device 104 and touch points 210b and 210c of peripheral device 202, and thus between peripheral devices 202 and 104. In one specific embodiment, the distance can vary from distance C by 1-2 millimeters. Thus, peripheral devices 202 and 104 can have different identities, which can be determined by processor 118.

While FIG. 2a has been described with respect to processor 118 identifying one of the peripheral devices 202 and 104 based on contemporaneous touches 126 as compared to two touch points of one of peripheral devices 202 and 104, in some embodiments, one of the peripheral devices 202 and 104 can be identified based on contemporaneous touches 126 as compared to more than two touch points of one of peripheral devices 102 and 104.

Referring to FIG. 2b, FIG. 2b shows a bottom view of peripheral device 202 according to one embodiment of the present invention. According to one embodiment, processor 118 can identify peripheral device 202 based on contemporaneous touches 126 as compared to one of touch points 210a, 210b, and 210c of peripheral device 202 and touch points 114a, 114b, and 114c of peripheral device 104. Thus, identifying data 130 can characterize touch points 210a, 210b, and 210c of peripheral device 202 and touch points 114a, 114b, and 114c of peripheral device 104.

As shown in FIG. 2b, touch points 210a, 210b, and 210c have a particular arrangement on base 240. For example, touch points 210a and 210c are separated by distance A, touch points 210a and 210b are separated by distance B, and touch points 210b and 210c are separated by distance C. When touch points 210a, 210b, and 210c provide touches 111a, 111b, and 111c in contemporaneous touches 126 on touch surface 116, touches 111a, 111b, and 111c will be separated by corresponding distances A, B, and C. Thus, according to one embodiment, distances between touch points 210a, 210b, 210c can characterize the arrangement of touch points 210a, 210b, and 210c of peripheral device 202. Thus, identifying data 130 in memory 120 can comprise distances A, B, and C.

Similarly, identifying data 130 in memory 120 can comprise distances between touch points 114a, 114b, and 114c, which characterizes the arrangement of touch points 114a, 114b, and 114c of peripheral device 104. The distances can be provided such that processor 118 can distinguish between touch points 114a, 114b, and 114c of peripheral device 104 and touch points 210a, 210b, and 210c of peripheral device 202, and thus between peripheral devices 202 and 104. Thus, peripheral devices 202 and 104 can have different identities, which can be determined by processor 118.

In the embodiment described with respect to FIG. 2b, identifying data 130 comprises distances A, B, and C. However, in other embodiments identifying data 130 can comprise alternative or additional information, such that processor 118 can identify peripheral device 202. Other information can include, for example, angles between touch points 210a, 210b, and 210c and the area between touch points 210a, 210b, and 210c.

Furthermore, processor 118 can determine the orientation of peripheral device 202 based on contemporaneous touches 126 as compared to touch points of peripheral device 102. For example, in the present embodiment, because identifying data 130 can characterize at least three touch points, for example, touch points 210a, 210b and 210c, processor 118 can determine the orientation of peripheral device 202 with respect to touch surface 116. As a specific example, processor 118 can associate touch point 210c with the back of peripheral device 202 and the midpoint of distance B with the front of peripheral device 202.

Figure 3B:
FIG. 3b shows an isometric back view of a peripheral device, according to one embodiment of the present invention.
Figure 3B:
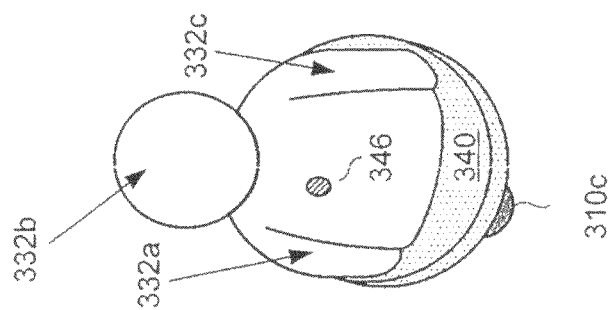
Figure 3A:
FIG. 3a shows an isometric front view of a peripheral device, according to one embodiment of the present invention.
Figure 3A:
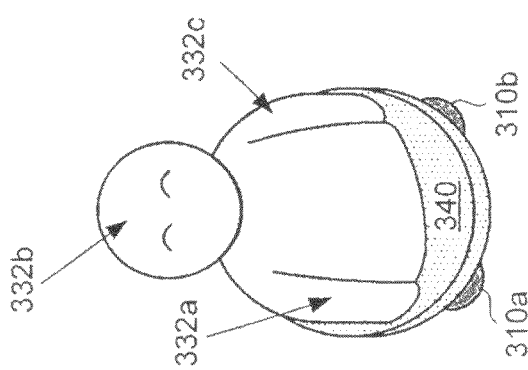

Referring now to FIGS. 3a and 3b, FIGS. 3a and 3b respectively show isometric front and back views of peripheral device 302, according to one embodiment of the present invention, which can correspond to peripheral device 102 in FIGS. 1a and 1b and peripheral device 202 in FIGS. 2a and 2b. Peripheral device 302 includes base 340 and touch points 310a, 310b, and 310c, which can correspond respectively to base 240 and touch points 210a, 210b, and 210c in FIGS. 2a and 2b. Peripheral device 302 further includes contact regions 332a, 332b, and 332c on peripheral device 302.

In peripheral device 302, each of contact regions 332a, 332b, and 332c are configured to transfer at least one touch to touch surface 116 through any combination of touch points 310a, 310b, and 310c, for example, by providing a grounding path when touch points 310a, 310b, and 310c are provided over touch surface 116. For example, when a user touches one of contact regions 332a, 332b, and 332c with a finger, the touch can be transferred through at least one of touch points 310a, 310b, and 310c over touch surface 116. In one embodiment, touch lead 108 (not shown in FIGS. 3a and 3b), inside peripheral device 302, provides the grounding path between at least one of contact regions 332a, 332b, and 332c and at least one of touch points 310a, 310b, and 310c.

It is preferred that touch lead 108 provides a grounding path between at least one of contact regions 332a, 332b, and 332c and at least two of touch points 310a, 310b, and 310c. Thus, peripheral device 302 can expand, for example, one touch on peripheral device 302 to a plurality of contemporaneous touches on touch surface 116. By way of example, in the embodiment described with respect to FIG. 2b, it is preferred that touch lead 108 provides a grounding path between at least one of contact regions 332a, 332b, and 332c and each of touch points 310a, 310b, and 310c to provide a plurality of contemporaneous touches, such as contemporaneous touches 126, shown in FIG. 1a.

Peripheral device 302 can further include touch switch 346 connected to a touch lead, such as touch lead 108, in addition to or instead of contact regions 332a, 332b, and 332c, which, when enabled, can provide touches on touch surface 116 through any combination of touch points 310a, 310b, and 310c. Touch switch 346 can provide touches on touch surface 116 without requiring user contact with peripheral device 302, for example, by providing charge variation on touch surface 116 when enabled.

Peripheral device 302 can include additional touch leads similar to touch lead 108. As a particular example, in the embodiment described with respect to FIG. 2a, touch lead 108 can provide a grounding path between, for example, contact regions 332a and 332c and touch points 310b and 310c to provide two contemporaneous touches on touch surface 116. At least one additional touch lead can be included in peripheral device 302, so that touch point 310a can comprise a toggle point, which can provide a signal to electronic device 106 using touch 111a. According to various embodiments, the signal can function by activating or deactivating at least one touch, such as touch 111a from touch point 310a. The toggle point may signal electronic device 106 by moving touch point 310a closer or farther away from touch surface 116 or by connecting or disconnecting touch point 310a with a grounding path to toggle touch 111a. Furthermore, the toggle point may signal electronic device 106 by changing the identity of peripheral device 302 or by pulsing a touch on and off. It will be appreciated that multiple toggle points can be included in peripheral device 302 as groups of connected toggle points or each can provide a separate signal to electronic device 106.

In some embodiments, the toggle point can remain isolated from touch lead 108, for example, to provide a signal to electronic device 106 using touch 111a separate from touches 111b and 111c. As a specific example, the additional touch lead can provide a grounding path between contact region 332b and touch point 310a. In this example, the toggle point can function as a button that a user can press by touching contact region 332b, for example, to fire a gun or select a menu option in a video game or other software, which is displayed on touch surface 116.

In other embodiments, the toggle point can become connected to touch lead 108, to signal electronic device 106 as to a condition of peripheral device 302. For example, putting a laser or other accessory in Buzz Lightyear's hand may signal electronic device 106 by changing the identity of peripheral device 302 or send a pulsing signal or pulse to electronic device 106 using touch 111*a*. The accessory may, for example, be attached to peripheral device 302 thereby shorting a conductive path to a touch lead, such as touch lead 108, or triggering a switch in peripheral device 302. In some embodiments the accessory can be another peripheral device, for example Buzz Lightyear could be put into his spaceship and electronic device 106 could run a space themed mini-game.

In further embodiments, peripheral device 302 may comprise a poseable or transformable figurine or action figure, where the toggle point signals to electronic device 106 that a different pose or transformation has occurred. As an example, electronic device 106 can be running a video game and peripheral device 302 can be a Buzz Lightyear Figurine, from Disney's Toy Story, holding a laser gun in his hand. When a user raises Buzz Lightyear's hand, touch point 310*a* can toggle, thereby providing a signal to electronic device 106 as touch 111*a* as described above. For example, a switch at the pivot point of Buzz Lightyear's arm could toggle touch point 310*a*. Subsequently, electronic device 106 can run a mini-game, such as a shooting game responsive to the signal. The toggle point can then be used as a button so that a user can fire the laser gun in the mini-game by touching, for example, contact region 332*b*. Alternatively, another toggle point could be used as the button.

Moving to FIG. 4, FIG. 4 shows a flowchart describing the steps, according to one embodiment of the present invention, by which a touch-sensitive system may facilitate an interaction using first and second peripheral devices. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400. For example, as shown in FIG. 4, step 440 can be optional. Furthermore, in some embodiments, step 450 can be performed after step 450.

Referring to step 410 of flowchart 400 in FIG. 4 and FIGS. 1*a* and 1*b*, step 410 of flowchart 400 comprises providing touch points 110*a*, 110*b*, and 110*c* of peripheral device 102 over touch surface 116 of electronic device 106. For example, a user can place peripheral device 102 on touch surface 116 such that touch points 110*a*, 111 and 110*c* are over touch surface 116. As a specific example, as shown in FIG. 1*b*, peripheral devices 102, 104, and 150 can represent digital characters in a video game running on electronic device 106. Furthermore, electronic device 106 may have any of the identity, position, and orientation of peripheral devices 104 and 150 stored in memory 120 prior to step 410, which may have been determined by processor 118 using steps similar to those shown in flowchart 400. Alternatively, any of the identity, position, and orientation of peripheral devices 104 and 150 can be determined by processor 118 after step 410.

Referring to step 420 of flowchart 400 in FIG. 4 and FIGS. 1*a*, 1*b*, 3*a*, and 3*b*, step 420 of flowchart 400 comprises processor 118 detecting contemporaneous touches 126 on touch surface 116. For example, a user can touch at least one of contact regions 332*a*, 332*b*, and 332*c*, such that touch points 110*a*, 110*b*, and 110*c* can provide contemporaneous touches 126 on touch surface 116. Alternatively, touch switch 346 can be enabled to provide contemporaneous touches 126 on touch surface 116.

Referring to step 430 of flowchart 400 in FIG. 4 and FIGS. 1*a* and 1*b*, step 430 of flowchart 400 comprises processor 118 identifying peripheral device 102 based on contemporaneous touches 126 as compared to touch points 110*a*, 110*b*, and 110*c* of peripheral device 102. For example, processor 118 can compare distances between touches 111*a*, 111*b*, and 111*c* of contemporaneous touches 126 to distances between touch points 110*a*, 110*b*, and 110*c* of peripheral device 102 using identifying data 130 to identify peripheral device 102. As a specific example, processor 118 can identify peripheral device 102 as Woody, peripheral device 104 as Buzz Lightyear, and peripheral device 150 as Hamm from Disney's Toy Story.

Referring to step 440 of flowchart 400 in FIG. 4 and FIGS. 1*a* and 1*b*, step 440 of flowchart 400 comprises processor 118 optionally determining the orientation of peripheral device 102 based on contemporaneous touches 126 as compared to touch points 110*a*, 110*b*, and 110*c* of peripheral device 102. For example, processor 118 can compare distances between touches 111*a*, 111*b*, and 111*c* of contemporaneous touches 126 to distances between touch points 110*a*, 110*b*, and 110*c* of peripheral device 102 using identifying data 130 to determine the orientation of peripheral device 102 with respect to touch surface 116.

Referring to step 450 of flowchart 400 in FIG. 4 and FIGS. 1*a* and 1*b*, step 450 of flowchart 400 comprises processor 118 performing an interaction using peripheral device 102 and peripheral device 104. For example, processor 118 can implement a video game using peripheral devices 102 and 104 as game pieces. The interaction can utilize the identity of peripheral device 102. In some embodiments, for example, processor 118 can provide a feedback signal indicating that processor 118 has identified peripheral device 102. For example, processor 118 can provide a feedback signal such that speaker 152 produces an audible indicator after processor 118 has identified peripheral device 102. Also, in some embodiments the audible indicator can depend on the identity of peripheral device 102 with respect to other peripheral devices, such as peripheral device 104. As an example, peripheral device 102 could be identified as Woody and the audible indicator could be in the voice of Woody saying, "Well, if it's a sheriff you need, you sure came to the right toy." Furthermore, according to some embodiments, the audible indicator can be context sensitive, for example, based on the position of peripheral device 102 on touch surface 116, a state of the video game being running or any of the identity, position, and orientation of peripheral devices 104 and 150 stored in memory 120. For example, the audible indicator could be in the voice of Woody saying, "Howdy Buzz, what brings you around these parts?" based on the identity of peripheral device 104 as Buzz Lightyear.

Furthermore, the interaction can be based on any of the position and orientation of peripheral device 102 relative to touch surface 116. For example, in one embodiment processor 118 can facilitate an interaction using peripheral device 102 and 104 based on the position and orientation of peripheral device 102 with respect to peripheral device 104. As a specific example, processor 118 can determine that the front of peripheral device 102 is facing the front of and is adjacent to peripheral device 104 as shown in FIG. 1*b*. Subsequently, using speaker 152, processor 118 can simulate a conversation between peripheral devices 102 and 104 based on the identities of peripheral devices 102 and 104. Similarly, processor 118 can determine that the front of peripheral device 102 is not facing the front of and is not adjacent to peripheral device 150 and can simulate a conversation between peripheral devices 102 and 150 using speaker 152.

An exemplary sequence will be described below with respect to the video game shown in FIG. 1b. In the present example, peripheral device 102 can be Woody, peripheral device 104 can be Buzz Lightyear, and peripheral device 150 can be Hamm from Disney's Toy Story. Processor 118 could already have determined the identity, position, and orientation of peripheral devices 104 and 150, which can be stored in memory 120. Thus, electronic device 106 can track that peripheral device 150 has the identity of Hamm, is positioned close to the front of house 162, and is orientated with its front facing away from house 162 and towards lake 160. Furthermore, electronic device 106 can track that peripheral device 104 has the identity of Buzz Lightyear, is positioned near horse 170, and is facing away from horse 170.

A user could have recently provided peripheral device 102 over touch surface 116 in accordance with step 410. Subsequently, processor 118 can detect touch points from peripheral device 102 based on contemporaneous touches on touch surface 116 in accordance with step 420. Processor 118 can then identify peripheral device 102 as Woody in accordance with step 430. After peripheral device 102 is identified, Woody can say, "Well, if it's a sheriff you need, you sure came to the right toy" using speaker 152. Also, processor 118 can determine that peripheral device 102 is next to and facing the front of peripheral device 104 based on the orientation and position of each peripheral device, which is being tracked by electronic device 106. Based on this orientation and positioning, processor 118 can simulate a conversation between Buzz and Woody. For example, Buzz could say, "Hey Woody, warm day we are having isn't it?" using speaker 152. Then Woody could say, "Sure is Buzz, wish I had a way to cool down."

Next, because processor 118 has determined that peripheral device 102 has the identity of Woody, that peripheral device 150 has the identity of Hamm, and that truck 164 is positioned between peripheral devices 150 and 102, peripheral device 150 (e.g., Hamm) could say using speaker 152, "Hey Woody! Buzz! Is that you? I didn't see you behind that truck. Would you like to cool down with a swim in my lake?" Based on the relative position of peripheral devices 104 and 150, electronic device 106 can determine that Hamm is far apart from Buzz and Woody and thus, using speaker 152, Buzz can say, "Hey Hamm! I didn't see you over there. Woody, I'm busy saving the planet, but you can go ahead . . . I just don't see how are you going to get all the way to Hamm's house?" Then, based on the orientation of peripheral device 102 and 104 being tracked by electronic device 106, processor 118 can determine that peripheral device 104 is facing away from and therefore cannot see horse 170 and furthermore that peripheral device 102 is facing and therefore can see horse 170. Based this information, Woody could say, "Buzz! I guess you didn't notice my horse Bullseye is right behind you. I'll hop on Bullseye and head over." Based on the position of peripheral devices 102 and 104, tracked by electronic device 106, touch surface 116 can display an arrow from peripheral device 102 to horse 170, which goes around peripheral device 104, to indicate that the user should move peripheral device 102 over horse 170.

The user can then move peripheral device 102 toward horse 170 and because electronic device 106 is tracking that peripheral device 102 is positioned over grass 172 and has the identity of Woody, who is a cowboy, processor 118 can select the sound of cowboy boots walking on the grass to be played using speaker 152 as peripheral device 102 moves over touch surface 116. When processor 118 determines that peripheral device 102 is over horse 170, a mini-game can commence where horse 170 stays under peripheral device 102 as peripheral device 102 is moved by the user because peripheral device 102 is having its position tracked over touch surface 116 by electronic device 106. The mini-game can be for example, a traffic dodging game where horse 170 must cross road 168 while avoiding truck 164 and car 166. The sequence can incorporate various cinematics displayed on touch surface 116. For example, as the position of peripheral device 102 is moved by the user to near road 168, touch surface 116 can zoom in to display a more detailed traffic scene. Furthermore, based on processor 118 determining that peripheral device 106 is positioned over road 168, speaker 152 can play the sound of a horse walking on a road, as opposed to walking on a grassy surface when positioned over grass 172. The mini-game could end when processor 118 determines that peripheral device 102 and horse 170 are positioned near lake 160.

Thus, according to various embodiments, as set forth in FIGS. 1a, 1b, 2a, 2b, 3a, 3b, and 4, the present invention provides for interactive game pieces and/or toys, which can be used with touch screen devices. A touch-sensitive system can, for example, facilitate an interaction using peripheral devices 102, 104, and 150 by determining the identity, position, and orientation of each peripheral device. The interaction can be structured as a video game, which can run based on any of the identity, position, and orientation of each peripheral device. Thus, embodiments of the present invention can provide a robust interactive experience. Furthermore, the interaction can utilize inexpensive touch-based input methods and shared electronic components, such as speaker 152, processor 118, memory 120, and touch surface 116 of electronic device 106. Thus, each of peripheral devices 102, 104, and 150 can be provided with reduced cost and complexity.

Specifically, an embodiment of the present invention is related to the interaction of the iPad with game pieces, e.g. about one inch diameter or less. Various embodiment so the present invention provide techniques and systems for creating game pieces that provide a cost-effective input method to the touch device through a screen, such as a capacitive screen.

Today, iPad's capacitive screen has only been used for direct human input using fingers or styluses. All other devices need to use a proprietary 30-pin connector, Wi-Fi, Bluetooth or audio I/O interfaces, which ads significant costs.

In one embodiment of the present invention, the pieces have no active components and rely purely on strategically placed conductive components and to be sensed by the screen.

We have invented a coding system for distinguishing and tracking game pieces placed on capacitive touch screens/surfaces. This system additionally allows for a detection of angular rotation or orientation of individual game pieces.

The coding mechanism includes small 4-8 mm diameter conductive flat disks positioned at specific points on the bottom surface of the piece. The discs are interconnected and also routed through the game pieces for touch and/or close proximity to fingers when the piece is handled. The number and relative position of these "touch-points" allows for their unique identification and orientation.

Additional touch points are connected to specific active areas on the pieces, so that these points are active only when the user touches the specific areas. This allows for clicking/triggering actions while the piece is on the board. Furthermore, specific articulation points, settings, dials on the figure can modify the routing of conduction from the finger to the touch points, thus the same piece can be sensed by the screen as having different configurations based on physical modifications of the piece.

FIGS. 1-3 of provisional application Ser. No. 61/399,249 show one embodiment of a game piece according to the present invention (front view, back view and bottom view, respectively.) According to this embodiment, Buzz Lightyear game piece has three touch-points that can contemporaneously touch the iPad screen. Two touch-points may distinguish between a number of game pieces based on the distance between the two touch points. The third touch point will also provide information regarding the orientation of the game piece. For example, based on the length of each side of triangle creates by the three touch-points, the touch detection application can distinguish the game pieces and determine the orientation. As an example, three touch-points of a first game piece may have sides of 10 mm, 15 mm and 20 mm defined by distances between the touch points, and three touch-points of a second game piece may have sides of 18 mm, 12 mm and 22 mm defined by distances between the touch points. It can also be defined that the head of the first game piece is where the 10 mm and 15 mm sides meet, and the head of the second game piece is where the 12 mm and 22 mm sides meet. As result the touch detection application (or game application) can determine the game piece and its orientation, and provide an interaction between game pieces based on their location and orientation, as well as placement and orientation on the game board.

This is significant in that gameplay interactions involving the following is possible:
  Recognition of different physical game pieces
  Location of said pieces
  Orientation of said pieces
  Interactivity between 2 or more physical pieces
  Interactivity between pieces and the digital environment The above benefits would not be possible purely from using fingers. The persistence of game pieces on the iPad screen enables it to be used as a dynamic backdrop for gameplay. The orientation-awareness of multiple game pieces simultaneously would not be replicable on the iPad with just using fingers.

The benefits described above unlocks many gameplay possibilities, from using the iPad as a game board to fully interactive choose-your-own-adventure digital worlds.

Below is a full gameplay of a possible execution for Toy Story3.

Game Synopsis:
  Recreate iconic 2-person Tron Light Battle game in an arena setting. Introduce a new element of game play in having figure game pieces as controllers. Game design does not need to recognize different characters/angle of rotation. Game pieces will have single capacitive material point of contact identical to iPad stylus.

Gameplay Rules:
  Air Hockey game engine (without goal slot on either end of grid)
  2 player version only (one player blue, one player orange)—players do not need to be rendered. Game pieces can only move freely on their half of the grid.

Gameplay State:
State A (Game Initialize):
  Game grid is empty when no pieces are placed iPad screen
  Dynamic circular transparent graphics in blue/orange (similar to mixxmaxx) to appear around game pieces when placed onto screen.
  Game pieces are in State1
State B (Game in Session):
  Light disc will follow physics engine of air hockey game (remove goal slot from existing game).
  Discs will leave a faint light trail
  When players are hit by disc of different color, will register as a hit and proceed to State C
  When players are hit by disc of identical color, will either reflect disc off (State2) or catch disc (State3).
State C (Player Hit):
  When hit by different colored disc, will register as a hit. Game play is temporarily halted for 2
  seconds and the words "Orange Player hit" or "Blue Player hit" will be displayed across the
  game grid for that time duration.
  Gameplay restarts in State A
Gamepiece State:
State 1 (Game Initialize):
  Each player to start with one light disc (one orange, one blue). Disc will float beside action figure
  gamepiece until single tap on player side of the grid.
  On single tap in lower right corner of screen (with button indicated "throw") in player half of
  game grid, Player now will launch the disc+player is put into State 2.
State 2 (Catch Disc):
  Disc bounces around game grid with similar characteristics as air hockey game engine until it
  hits the player with the same color. Disc will float beside action figure as in State 1.
  On single tap in lower right corner of screen (with button indicated "throw") in player half of
  game grid, Player now will launch the disc again and have it float beside himself (State 1)
State 3 (Hit by Different Color Disc):
  On hit by different colored disc, existing dynamic circular transparent graphics (similar to mixxmaxx) will appear to shatter into tiny pieces and fly away from gamepiece in slow motion.
  Transition to Gameplay State C.
Concepts to Showcase:
  Recognition of different physical game pieces
  Location of pieces
  Orientation of pieces
  Interactivity between 2 physical pieces
  Interactivity between pieces and the digital environment
  Mini-games
  Education possibilities
Presentation Flow:
  1. Reason (unique IDs)
  2. Proof (location & orientation)
  3. Build the Case (context in game, actual game)
  4. Beyond (expansion possibilities)
Playset Concept:
  The player can place her physical games pieces on a virtual playset map presented on the iPad screen.
  The Toy Story version can be seen on the ground in this picture of the Day Care Center.
Features:
  "Playground" Environment
    Interactive Characters
    Interactive Environment
    Spaceship Mini-game Drag Buzz, and twist to avoid/shoot Asteroids for points
Bullseye Ride Mini-game (optional)
Drag Woody to avoid obstacles, twist to lasso pickups for points Character Game Pieces:
Buzz
Woody
Rex
Hamm Playmat Features:
Road
Water (River or Lake)
Grass
Wooden Bridge over Water
Spaceship
Virtual Character: Bullseye
Virtual Character: Bo-Peep (or Sarge)
Virtual Characters: 3 Aliens
Virtual Character: Cow
Virtual Character: Zurg Key Functions:
Character Pieces say something unique when first placed:
Buzz: "Buzz Lightyear, reporting!"
Woody: "Well, if its a sheriff you need, you sure came to the right toy."
Hamm: "That's Mister Evil Doctor Pork Chop to you!"
Rex: "Raaar! Did I scare you?"
Character Pieces make a specific walking sound when dragged across certain virtual terrain:
Tik-Tak of pavement under boots (a road)
Clip-Clop of wood under boots (a wooden bridge)
Slish-Slosh of water under boots (wading through water sound)
No sound when dragging across grass
Character Pieces talk to each other if they are close and facing
Woody: "Hey Buzz"
Buzz: "Greetings, Sheriff"
Rex: "Is Cowboy Rex a good name?"
Woody: "HA! Hilarious" or "I love it" (randomly)
Character Pieces talk to virtual on device characters when close and facing
Woody: "Howdy!"
Bo Beep: "Thank goodness you're here, Sheriff!"
Put Buzz in Spaceship to launch space mini game
Put Buzz in ship, ship lights up
Buzz: "To infinity and beyond!"
Lift Buzz figure
Spaceship launches
Aliens: Ooooooo!
Screen switches to mini game
Put Woody on Bullseye to launch ride mini game (optional)
Put Woody on Bullseye
Drag Woody (riding Bullseye) over to end of road
Lift Woody
Woody: "Ride like the wind, Bullseye!"
Screen switches to mini-game
Bonus "Fun" Functions (Mini-Mini-Games, doesn't leave playset screen to play)
Aliens follow Buzz around like ducklings
Woody can "ride" Bullseye (put Woody on Bullseye and drag)
Cow shows up on Playmat, Woody can throw a lasso at the cow (move close, face cow)
Zurg shows up on Playmat, Aliens hide behind Buzz, Buzz can shoot a laser at Zurg (move close, face Zurg)
Turn out "lights", characters cast flashlight in front of them, use to scare off ghosts
Hamm Barn-Maze Mini-Game (drag Hamm through a maze of haystacks in a barn to find exit)
Rex Rampage Mini-Game (drag Rex through a miniature town to smash buildings down)
Zurg as actual physical game piece
Jessie as actual physical game piece From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of facilitating an interaction with a physical toy using a touch-sensitive system having a processor and a touch surface, the physical toy having a receiving part for attaching a physical accessory thereto and detaching the physical accessory therefrom, the method comprising:
running, using the processor, an interactive software on touch-sensitive system;
displaying, using the processor, digital elements on a screen display of the touch surface;
detecting, using the touch surface and the processor, the physical toy using a plurality of touch points of the physical toy touching the touch surface of the touch-sensitive system when the physical accessory is not attached to the physical toy;
determining, using the processor, a position of the physical toy with respect to the digital elements displayed on the touch surface;
determining, using the processor, that the physical accessory is attached to the physical toy by detecting, using the touch surface, one of the plurality of touch points of the physical toy, wherein the one of the plurality of touch points is activated in response to attaching the physical accessory to the receiving part of the physical toy; and
interacting with the physical toy based on the physical accessory attached to the physical toy and the position of the physical toy with respect to the digital elements displayed on the touch surface.

2. The method of claim 1, wherein the interactive software is a video game, and the digital elements are images displayed by the video game on the screen display.

3. The method of claim 1, wherein the interactive software is an educational software, and the digital elements are images displayed by the educational software on the screen display.

4. The method of claim 1 further comprising determining an orientation of the physical toy, and wherein the interacting with the physical toy includes interacting with the physical toy based on the orientation of the physical toy.

5. The method of claim 1, wherein the determining that the physical accessory is attached to the physical toy is performed using the touch surface of the touch-sensitive system.

6. The method of claim 1, wherein the physical toy has a figure of a person, and the receiving part of is a hand.

7. The method of claim 1, wherein the physical accessory is a gun.

8. A touch-sensitive system facilitating an interaction with a physical toy having a receiving part for attaching a physical accessory thereto and detaching the physical accessory therefrom, the touch-sensitive system comprising:

a touch surface; and a processor configured to run an interactive software for:

displaying digital elements on a screen display of the touch surface;

detecting, using the touch surface, the physical toy using a plurality of touch points of the physical toy touching the touch surface when the physical accessory is not attached to the physical toy;

determining a position of the physical toy with respect to the digital elements displayed on the touch surface;

determine that the physical accessory is attached to the physical toy by detecting, using the touch surface, one of the plurality of touch points of the physical toy, wherein the one of the plurality of touch points is activated in response to attaching the physical accessory to the receiving part of the physical toy; and interacting with the physical toy based on the physical accessory attached to the physical toy and the position of the physical toy with respect to the digital elements displayed on the touch surface.

9. The touch-sensitive system of claim 8, wherein the interactive software is a video game, and the digital elements are images displayed by the video game on the screen display.

10. The touch-sensitive system of claim 8, wherein the interactive software is an educational software, and the digital elements are images displayed by the educational software on the screen display.

11. The touch-sensitive system of claim 8, wherein the processor is further configured to run the interactive software for:

determining an orientation of the physical toy, and wherein the interacting with the physical toy includes interacting with the physical toy based on the orientation of the physical toy.

12. The touch-sensitive system of claim 8, wherein the processor is configured to determine that the physical accessory is attached to the physical toy using the touch surface of the touch-sensitive system.

13. The touch-sensitive system of claim 8, wherein the physical toy has a figure of a person, and the receiving part of is a hand.

14. The touch-sensitive system of claim 8, wherein the physical accessory is a gun.

\* \* \* \* \*

UNITED STATES PATENT AND TRADEMARK OFFICE
CERTIFICATE OF CORRECTION

PATENT NO. : 10,293,247 B2
APPLICATION NO. : 13/135538
DATED : May 21, 2019
INVENTOR(S) : Heatherly et al.

It is certified that error appears in the above-identified patent and that said Letters Patent is hereby corrected as shown below:

On the Title Page

Item (60) should read:
--"Related U.S. Application Data
Continuation of application No. 12/806,986, filed on Aug. 24, 2010, now abandoned.
Provisional Application No. 61/399,249, filed on Jul. 8, 2010."--

Signed and Sealed this
Sixteenth Day of July, 2019

Andrei Iancu
*Director of the United States Patent and Trademark Office*